UNITED STATES PATENT OFFICE.

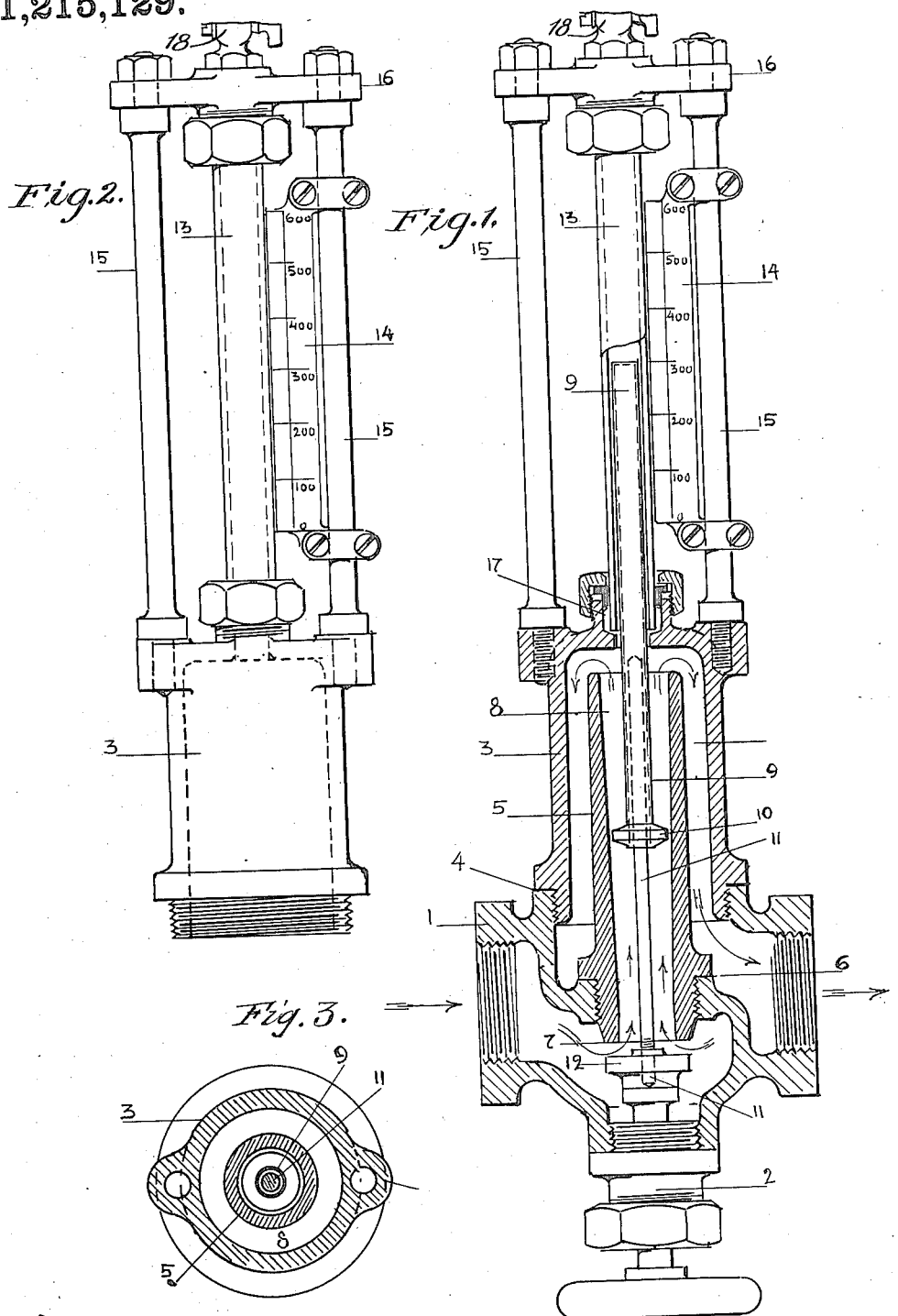

PAUL EDLICH, OF PASSAIC, NEW JERSEY.

FLOW-INDICATING VALVE.

1,215,129.

Specification of Letters Patent.

Patented Feb. 6, 1917.

Application filed January 11, 1916. Serial No. 71,505.

*To all whom it may concern:*

Be it known that I, PAUL EDLICH, a subject of the Emperor of Germany, residing at Passaic, in the county of Passaic and State of New Jersey, have invented certain new and useful Improvements in Flow-Indicating Valves; and I do hereby declare the following to be a full, clear, and exact description of the invention, such as will enable others skilled in the art to which it appertains to make and use the same.

The primary object of this invention is the provision of a novel type of fluid measuring and indicating device which can be conveniently associated with a valve and admit of the pressure or velocity of the fluid passing through the valve being accurately determined.

Another object of the invention is the provision of a measuring device, for carrying out the above object, and which will be of simple and durable construction and efficient in operation.

Other objects will appear and be better understood from that embodiment of my invention of which the following is a specification, reference being had to the accompanying drawing forming a part thereof, in which:

Figure 1 is a vertical sectional view, taken through a valve, showing the measuring device associated therewith, Fig. 2 is a side elevation of the measuring device detached from the valve, Fig. 3 is a transverse sectional view, taken through the measuring device.

Referring to the drawings in detail, and more particularly to Figs. 1, 2 and 3 therein, the numeral 1 designates a valve casing provided with the usual inlet and outlet passages and having one side provided with an opening which receives the usual type of apertured plug 2 through which the valve stem operates. A vertically disposed hollow cylindrical body 3 is associated with the valve casing 1 and has its lower end provided with a threaded extension which is received by a threaded opening in the valve casing and located at a point diametrically opposite the plug 2 and above the port which connects the inlet and outlet passages in the valve casing. The interior of the hollow body 3 communicates with the interior of the valve casing 1, and located within the hollow body 3 is an inverted conical shaped body 5, the lower end of which is threaded and received by the port which connects the inlet and outlet passages in the valve casing, the said lower end of the conical shaped body 5 being provided with an annular flange 6 which overlies the partition which has the port therein that connects the inlet and outlet passages in the valve casing 1, and the lower end of the conical body 5 is formed to provide a valve seat 7. The conical body 5 has an inverted conical shaped passage 8 therein within which is slidably mounted a tubular indicating element 9. The indicating element 9 has its lower end provided with a piston head 10, that has a central opening therein which communicates with the interior of the tubular indicating element 9 and extending through the opening in the piston head 10 and into the tubular indicating element 9 is the upper end of a guide rod 11, the lower end of the guide rod 11 being threaded and received by a central threaded opening in a valve 12 carried by the stem and is operable through the plug 2, the said valve being adapted when the stem is rotated in one direction to be seated against the seat 7 formed on the lower end of the conical body 5, and cut off communication between the inlet and outlet passages in the valve casing 1.

A gage glass 13 is disposed above the upper end of the hollow body 3, and located adjacent one side of the gage glass 13 is an elongated plate 14, which has a series of graduations thereon, the said plate 14 being provided with attaching elements which are connected to one of a pair of vertically disposed rods 15 which lie, respectively, on opposite sides of the gage glass 13, as shown more particularly in Figs. 1 and 2 of the drawings. The upper ends of the rods 15 extend through openings in a transversely extending plate 16, the said plate 16 being arranged above the upper end of the gage glass 13 and having its under side provided with a suitable fastening element that engages the upper end of the gage glass 13 so as to assist in holding the gage glass in operative position. The lower end of the gage glass 13 extends through an annular collar 17 formed on the upper end of the body 3 and is secured within the collar 17 in any suitable manner. The lower ends of the rods 15 have connection with the upper end of the body 3, and a suitable cock 18 is carried by the plate 16, which supports the upper ends of the rods 15 and has communication with the interior of the gage glass 13.

As shown in Fig. 2, the indicating tube 9 has the upper end thereof extended through an opening in the upper end of the body 3 and extends into the gage glass 13, so that when upward movement is imparted to the indicating element 9 the upper end thereof will be caused to successively register with the graduations formed on the plate 14.

When the valve 12 is closed, the indicating element 9 will be in its lowermost position and the piston head 10, located at the lower end of the indicating element 9, will be disposed adjacent the valve 12. When the valve 12 is moved to open position, as shown in Fig. 1, the pressure of the fluid against the lower face of the piston head 10 will force the piston head 10 and the indicating element 9 upwardly, so as to cause the upper end of the indicating element 9 to travel upwardly in the gage glass 13. As the pressure of liquid against the piston head increases, the indicating element 9 will be moved upwardly in proportion to the amount of pressure, and by virtue of the graduations on the plate 14 the pressure of the liquid against the piston head 10 can be determined. The fluid in passing through the conical shaped passage 8 in the conical body 5 is discharged through the upper end of the passage 8 into the space between the conical body 5 and the inner surface of the body 3, as indicated by the arrows, and thence discharged through the discharge passage in the valve casing 1.

It is evident that various changes might be resorted to in the construction, form and arrangement of the several parts without departing from the spirit and scope of my invention, hence I do not wish to limit myself strictly to the structure herein described and claimed.

Having thus described the invention what is claimed as new is:

1. In a device for measuring the flow of fluid, the combination with a casing having inlet and discharge passages therein, and a partition located within the casing and having a port therein, of a hollow body associated with the casing and having its interior communicating with the interior of the casing, a second hollow body having its opposite ends open and having one end extending into the casing and received by the port in the partition wall and its opposite end extending into the first-mentioned hollow body, the said second-mentioned hollow body being adapted to establish communication between the inlet and discharge passages in the casing, a gage glass carried by the first-mentioned hollow body and having its interior communicating therewith, and a fluid controlled indicating element operable through the first and second-mentioned hollow bodies and through the gage glass, for the purpose specified.

2. In a device for measuring the flow of fluid, the combination with a casing having inlet and discharge passages therein and a hollow body for providing communication between the inlet and outlet passages, of a second hollow body carried by the casing and engaging over the first-mentioned body, a guide extending through the first-mentioned hollow body and through one end of the second-mentioned hollow body, a gage glass carried by the mentioned end of the second hollow body and having its interior communicating with the interior of the second body, a tubular indicating element slidably mounted on the guide and operable through the mentioned end of the second body and through the gage glass, a graduated plate located adjacent the gage glass, and a piston head connected to the inner end of the indicating element, for the purpose specified.

3. In a device for measuring the flow of fluid, the combination with a casing having inlet and discharge passages therein, of a hollow body carried by the casing and having its interior communicating with the interior of the casing, rods carried by the hollow body, a transversely extending plate carried by the rods, a gage glass located between the rods and interposed between the plate and the hollow body and secured thereto and having its interior communicating with the interior of the hollow body, a second plate located adjacent the gage glass and carried by one of the rods and having a series of graduations thereon, and a fluid operated indicating element operable through the hollow body and the gage glass and disposed in the path of communication between the inlet and outlet passages in the casing, for the purpose specified.

PAUL EDLICH.

Witnesses:
 ROBT. GESSINGER,
 OSCAR SOMMERMEYER.